July 16, 1957     O. H. BANKER     2,799,089
LIQUID LEVEL GAUGE
Filed Sept. 2, 1955
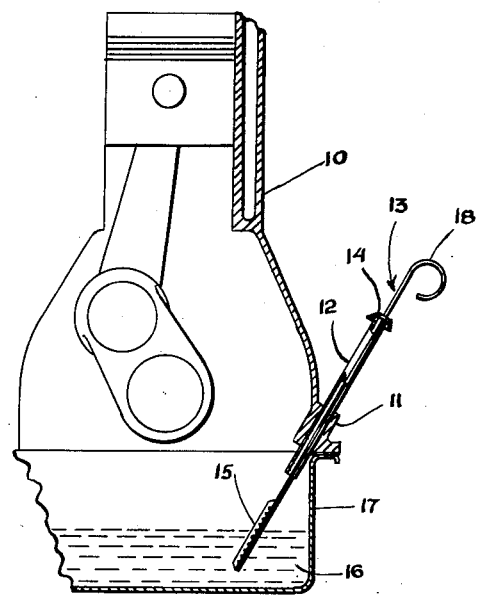
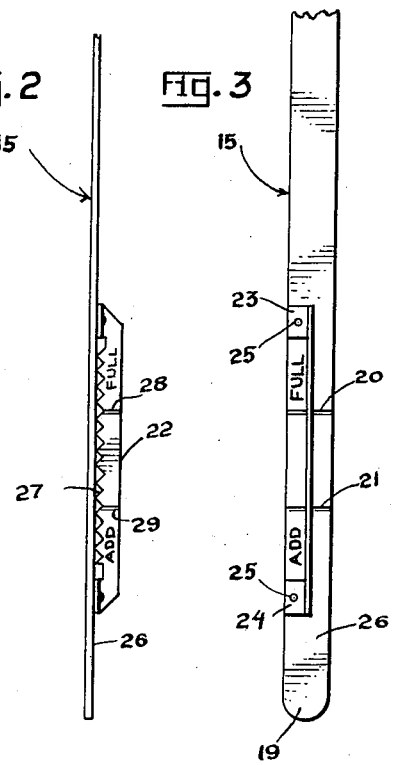
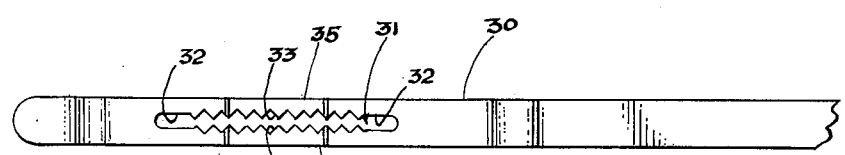
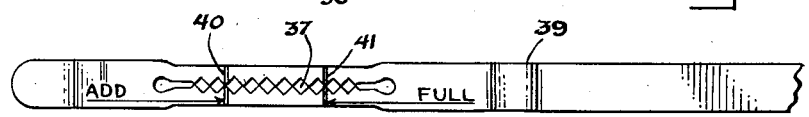
INVENTOR.
OSCAR H. BANKER
BY
Charles P. Vontech
ATTORNEY United States Patent Office 2,799,089
Patented July 16, 1957

2,799,089

LIQUID LEVEL GAUGE

Oscar H. Banker, Evanston, Ill., assignor to New Products Corporation, Skokie, Ill., a corporation of Delaware Application September 2, 1955, Serial No. 532,179

6 Claims. (Cl. 33—126.7)

This invention relates to liquid level gauges for indicating the level of oil in an engine crankcase, a reciprocating pump, a gear transmission, or the like.

It is an object of this invention to provide an oil level gauge of the type utilizing a strip of metal which is partially immersed in the oil so that a portion of the surface thereof is wetted by the oil, wherein a true indication of the level of the oil is obtained without the necessity of first wiping the indicating surface of the gauge and then re-immersing it in the liquid.

As a more specific object, this invention seeks to provide an oil level indicator or gauge which provides a more readily visible indication of the oil level than can be obtained from presently available gauges.

A further specific object of this invention is the provision of an oil level indicator in which means are provided for trapping and holding by capillary action a readily visible quantity of the oil to be measured, the location of the oil so held on the indicator being an indication of the level of the oil crankcase.

These and other objects of this invention will become apparent from the following detailed description when taken together with the accompanying drawings in which, Fig. 1 is a fragmentary section through an internal combustion engine crankcase showing the manner in which an oil level gauge may be mounted and held on such engine;

Figs. 2 and 3 are side and front elevations, respectively, of the indicating portion of an oil level gauge made in accordance with this invention;

Figs. 4 and 5 are front elevations of the indicating portion of a modification of the oil level gauge of Fig. 3, Fig. 4 showing the portion in intermediate and final stages respectively of manufacture; and Fig. 6 is a side elevational view of the gauge of Fig. 5.

Considering first the more general aspects of this invention, when a tube of fine diameter is immersed in a liquid and then withdrawn, the liquid finding its way into the tube when the tube is immersed remains in the tube when it is withdrawn. The liquid remains in the tube because of the surface tension of the liquid at the ends of the tube which overcomes the force of gravity tending to pull the liquid out of the tube.

The foregoing principle is utilized in the construction of the oil level gauges hereinafter to be described, and accordingly the gauges are provided with a series of openings extending across that portion thereof which indicates the low and high levels, that is, the unsatisfactory and satisfactory levels, of the oil in a crankcase or other receptacle to be measured. Assuming that the oil is not in motion, that is, is not splashed, and that the openings in the gauge prior to its insertion into the quiescent oil are empty, the immersion of the gauge portion containing the openings into the oil will cause the immersed openings to become filled with liquid, and those not immersed to remain empty so that when the gauge is withdrawn from the liquid, the level of the liquid can be read directly from the highest filled opening in the gauge.

Referring now to Fig. 1 for a description of one embodiment of this invention, there is shown a fragment of an engine cylinder block 10 in the lower portion of which is formed an angularly disposed boss 11 drilled to receive and fixedly support a tube 12 extending upwardly from boss 11. An oil level gauge 13 extends through tube 12 and is supported from the upper end thereof by a collar 14 fixed to gauge 13 and limiting the movement of the gauge into the tube. The lower end 15 of gauge 13 extends beyond the lower end of tube 12 and into the oil 16 contained in the oil pan 17 which is supported in a known manner from the open bottom end of cylinder block 10.

The upper end 18 of gauge 13 is formed into a handle by which the gauge may be grasped and manipulated. Said upper end extends outwardly beyond tube 12 a sufficient distance to be within easy reach from the exterior of the frame or body on which the engine is mounted. The lower end 15 of the gauge 13 is shown enlarged in Figs. 2 and 3 and is comprised of a relatively flat strip of steel having a rounded end 19 and having horizontal lines 20 and 21 stamped thereon indicating, respectively, the full and unsatisfactory levels of the oil. Suitable legends such as "Full" and "Add" are commonly stamped adjacent the horizontal lines 20 and 21, respectively.

Immediately adjacent the surface of lower end 15 containing the lines 20 and 21 is a strip 22, preferably of metal, disposed with its general plane at right angles to the plane of lower end 15. Strip 22 has formed on both ends thereof angularly disposed tabs 23, 24 which overlie strip 15 and are secured thereto by rivets 25, or alternatively, they may be secured by spotwelding, or in any other known permanent fashion. The edge of strip 22 immediately adjacent surface 26 is formed in any suitable manner with serrations 27 which may be of saw tooth form, and which, in one embodiment, measure approximately 1/16 of an inch from the tip of a tooth to its base. Said serrations extend from below the "Add" line 21 to a point above the "Full" line 20 so that the entire range of levels normally encountered in an engine crankcase is covered by the serrations.

When the engine is in operation, oil 16 will be splashed over substantially the entire lower end 15 of the gauge 13. Hence, when the engine is stopped and the gauge is immediately withdrawn from tube 12, all of the serrations 27 may be filled with oil. The serrations are then emptied, either by blowing across them, or by running a cloth along strip 22 adjacent the serrations, and the gauge is then reinserted into tube 12 until collar 14 strikes the upper end thereof. The gauge is withdrawn again and the level may be read by sighting across serrations 27. That portion of the serrations which has been immersed the second time will be filled with oil which had been trapped in the serrations and is held there by the surface tension of the oil. The relationship of the highest filled serration is then determined with respect to markings 20 and 21 to determine whether the level is satisfactory or unsatisfactory.

To facilitate the reading of the gauge, the lines 20 and 21 may be carried over to the surfaces of strip 22 as shown at 28 and 29 representing, respectively, the "Full" and "Add" lines, thereby making it unnecessary to turn the lower end 15 to expose surface 26 while taking a reading.

The modification shown in Figs. 4 to 6 inclusive is somewhat simpler to manufacture than the one shown in Figs. 1 to 3, inclusive, in that strip 22 has been eliminated and the perforations have been formed directly in the lower end 30 of the gauge. Inasmuch as the perforations are relatively small compared to the thickness of the strip, it would be difficult from a manufacturing standpoint to maintain in operation for a satisfactory length of time a punch adapted to form such closely spaced perforations.

The above mentioned difficulty is obviated in the design shown in Figs. 4 to 6 in that the perforations are formed as a single relatively wide slot 31 having substantially parallel sides 32 at the ends and serrations 33 and 34 formed in the sides of the slot intermediate the parallel ends 32. The width of the slot is so selected as to make it possible to construct and use with an average life expectancy a punch adapted to form a slot having the configuration of slot 31.

The necessary series of small openings for the successful application of the surface tension principle is then obtained by striking the side edges 35 and 36 of the lower end 30 in a suitable die to bring the tips of oppositely disposed serrations together as shown in Fig. 5. The result is the formation of a series of separate openings 37, each of which is sufficiently small to trap and hold oil in the same manner as the serrations 27 of the Fig. 1 to 3 form.

To provide protection against inadvertent wiping of the openings 37 upon withdrawal of the gauge from tube 12 and also to furnish a certain amount of stiffness to the lower end 30 of the gauge, said end 30 is formed in a die with a sinuous longitudinal cross section as shown at 38 and 39 in Figs. 5 and 6 below and above the openings 37.

The oil level is read by comparing the position of the highest filled opening 37 with the position of lines 40 and 41 stamped into the sides of the end 30 intermediate the ends 32 of slot 31, the lines preferably being accompanied by the legends "Add" and "Full." The openings 37 are first cleared of oil by blowing across or wiping them and then inserting the lower end 30 into the oil and withdrawing it therefrom to make the reading.

It is understood that the foregoing description is merely illustrative of a preferred embodiment of the invention and that the scope of the invention is not to be limited thereto but is to be determined by the appended claims.

I claim:

1. A liquid level gauge comprising a substantially rigid body having a portion thereof immersible in the liquid, said portion including a part having a serrated edge and another part contacting the serrated edge to form a series of individual openings through the body of a size adapted to retain the liquid therein by the surface tension of the said liquid, the level of the liquid being indicated by the position of the higest liquid-filled opening in the said series of openings.

2. A liquid level gauge as described in claim 1, said other part contacting the serrated edge having a substantially plane surface in contact with the serrated edge.

3. A liquid level gauge as described in claim 1, said other part contacting the serrated edge having a serrated surface, the serrations of the last-mentioned surface being substantially identical with the edge serrations and contacting corresponding parts of the said edge serrations.

4. A liquid level gauge comprising a substantially flat strip of rigid material having a portion thereof immersible in the liquid and a second strip secured to the first strip with the plane of the second strip disposed at an angle with respect to the plane of the first strip, the edge of the second strip adjacent the first mentioned strip having serrations therein forming with the flat strip a plurality of individual openings of a size adapted to retain the liquid therein by the surface tension of the said liquid, the level of the liquid being indicated by the position of the highest liquid-filled opening in the said series of openings.

5. A liquid level gauge comprising a substantially flat strip of rigid material having a portion thereof immersible in the liquid, said strip having opposed serrations arranged over the immersible portion thereof from a point corresponding to the lowest level to be indicated to a point corresponding to the highest level to be indicated, said opposed serrations contacting one another at the tips of the serrations to form distinct openings, said openings being of a size such that liquid in said openings will be retained therein by the surface tension of said liquid.

6. A liquid level gauge as described in claim 5, and indicia adjacent the said openings indicating satisfactory and unsatisfactory levels of the liquid being measured.

References Cited in the file of this patent

UNITED STATES PATENTS

| 946,695 | Dinsmoor | Jan. 18, 1910 |
| 1,574,267 | Warner | Feb. 23, 1926 |
| 1,776,942 | Deutsch | Sept. 30, 1930 |
| 2,053,460 | Brown | Sept. 8, 1936 |

FOREIGN PATENTS

| 162,959 | Great Britain | May 12, 1921 |